United States Patent [19]
Wang

[11] Patent Number: 5,772,742
[45] Date of Patent: Jun. 30, 1998

[54] DYE SET FOR IMPROVED COLOR QUALITY FOR INK-JET PRINTERS

[75] Inventor: Patricia A. Wang, Corvallis, Oreg.

[73] Assignee: Hewlett-Packard Company, Palo Alto, Calif.

[21] Appl. No.: 851,981

[22] Filed: May 6, 1997

[51] Int. Cl.$^6$ ..................................................... C09D 11/02
[52] U.S. Cl. ..................................... 106/31.27; 106/31.58
[58] Field of Search ............................... 106/31.27, 31.58

[56] References Cited

U.S. PATENT DOCUMENTS

| | | | |
|---|---|---|---|
| 5,143,547 | 9/1992 | Kappele | 106/31.27 |
| 5,145,519 | 9/1992 | Kappele | 106/31.27 |
| 5,273,573 | 12/1993 | Kappele | 106/31.27 |

FOREIGN PATENT DOCUMENTS 9600300  8/1996  WIPO.

Primary Examiner—Helene Klemanski
Attorney, Agent, or Firm—Soodabeh Tronson

[57] ABSTRACT

In accordance with the invention inks suitable for use in ink-jet printers and method for formulating the same are provided. The present dye set exhibits excellent color quality and lightfastness across a range of media. Furthermore, the dye set preserves its performance over a wide pH range, particularly low pH. This functionality across a wide pH range, enables the use of pH- sensitive bleed control mechanisms. More specifically, a specific dye set for formulating the yellow, magenta, and cyan inks is disclosed, comprising Direct Yellow 132 and Acid Yellow 23; Magenta 377 and Acid Red 52; and Direct Blue 199 and Acid Blue 9; respectively.

19 Claims, No Drawings

DYE SET FOR IMPROVED COLOR QUALITY FOR INK-JET PRINTERS

FIELD OF INVENTION

The present invention generally relates to ink-jet printing, and in particular, to a specific dye set suitable for use with plain and coated papers and transparency films.

BACKGROUND OF INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers.

The non-impact printing process of ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

Commercially-available thermal ink-jet printers, such as DeskJet® printers available from Hewlett-Packard Company, use inks of differing hues, namely, magenta, yellow, and cyan, and optionally black. The particular set of colorants, e.g., dyes, used to make the inks is called a "primary dye set." A spectrum of colors, e.g., secondary colors, can be generated using different combinations of the primary dye set.

Any given perceived color can be described using any one of the color spaces, such as CIELAB, and Munsell, as is well known in the art. For example, in the Munsell color space a given color is defined using three terms, Hue, Value, and Chroma. Similarly, in the CIELAB color space, a color is defined using three terms $L^*$, $a^*$, and $b^*$. $L^*$ defines the lightness of a color, and it ranges from zero (black) to 100 (white). The terms $a^*$ and $b^*$, together, define the hue and chroma characteristics of a given color. The term $a^*$ ranges from a more negative number, green, to a more positive number, red. The term $b^*$ ranges from a more negative number, blue, to a more positive number, yellow. Additional terms such as hue angle ($h°$) and chroma ($C^*$) are used to further describe a given color, wherein $$h° = \tan^{-1}(b^*/a^*) \qquad \text{equation 1}$$

$$C^* = (a^{*2} + b^{*2})^{1/2} \qquad \text{equation 2}$$

In the CIELAB color space, delta E ($\Delta E$) defines the difference between two colors, such as the color of the printed image as initially printed and the color after exposure to light (i.e., lightfade)—the higher the $\Delta E$ number, the more difference between the two colors $$\Delta E = [(L^*_2 - L^*_1)^2 + (a^*_2 - a^*_1)^2 + (b^*_2 - b^*_1)^2]^{1/2} \qquad \text{equation 3}$$

$$\Delta E = (\Delta L^{*2} + \Delta a^{*2} + \Delta b^{*2})^{1/2} \qquad \text{equation 4}$$

In general, a successful ink set for color ink-jet printing must have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set must also be kogation-resistant.

In addition, the ink set must be able to provide printed images having good color characteristics, such as correct hue and high chroma. While formation of colors on plain paper is required, it is also necessary that the ink set be useful on other print media, such as transparency film and coated paper. Another requirement for the ink set is to provide a hard copy output that is lightfast, thus preserving the integrity of the original color information.

While some of these conditions may be met by ink vehicle design, other conditions must be met by the proper selection and combination of the colorants. The selection of the colorants becomes especially important when additional limitations are placed on the choice of the colorants because of other system requirements, such as the color-to-color bleed control mechanism.

Regardless of whether an ink is dye-based or pigment-based, ink-jet inks commonly face the challenge of color-to-color or black-to-color bleed control. The term "bleed", as used herein, is defined to be the invasion of one color into another, once the ink is deposited on the print medium, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

One approach used for controlling bleed between the printed images, as disclosed in U.S. applications Ser. No. 08/567974 (entitled "Bleed Alleviation in Ink-Jet Inks using Organic Acids," filed by Adamic et al., and assigned to the same assignee as the present invention) and Ser. No. 08/741073 (entitled "Bleed Alleviation in Ink Jet Inks Using Acids Containing a Basic Functional Group," filed by Looman and assigned to the same assignee as the present invention), is to force the precipitation of a pH-sensitive dye in one ink (the pH-sensitive ink) on the print medium by contacting the pH-sensitive dye with a second ink (the target ink) having an appropriate pH (either higher or lower than the first ink). Upon contact on the print medium, the pH-sensitive dye of the first ink becomes insoluble, thus bleeding less.

To take advantage of the pH sensitivity mechanism for controlling bleed, it becomes important to have a set of inks that can provide all the above performance requirements in the appropriate pH range.

Therefore, a need exists for a dye set that can provide the appropriate color quality and lightfastness characteristics in a relatively low pH environment.

DISCLOSURE OF THE INVENTION

In accordance with the invention inks suitable for use in ink-jet printers and method for formulating the same are provided. The present dye set exhibits excellent color quality and lightfastness across a range of media. Furthermore, the dye set preserves its performance over a wide pH range, particularly low pH. This functionality across a wide pH range, enables the use of pH-sensitive bleed control mechanisms. More specifically, a specific dye set for formulating the yellow, magenta, and cyan inks is disclosed, comprising Direct Yellow 132 and Acid Yellow 23; Magenta 377 and Acid Red 52; and Direct Blue 199 and Acid Blue 9; respectively.

DETAILED DESCRIPTION OF THE INVENTION

The invention described herein is directed to a specific dye set for printing ink-jet images using commercially available ink-jet printers such as DESKJET® printers, manufactured by Hewlett-Packard Company, Palo Alto, Calif., The dye set enables an ink-jet color printer to produce high quality color images having excellent lightfastness, on a range of media. Furthermore, the dye set preserves its performance over a wide pH range, particularly low pH. This functionality across a wide pH range, enables the use of pH-sensitive bleed control mechanisms. The ink-jet ink compositions of the present invention, when used in a target ink (an ink having the appropriate pH to cause precipitation of a pH-sensitive colorant in a pH-sensitive ink) comprise a water-soluble acid, preferably an organic acid having a $pK_a$ equal to or less than that of the pH-sensitive colorant of concern.

The aqueous inks of the present invention comprise, by weight (expressed as a percentage of total ink composition), from about 0.1 to about 7 wt. % colorant; from about 0.1 to about 20 wt. % organic acid; from about 0.1 to about 20 wt. % pH-adjusting component; from about 3 to about 20 wt. % alcohol; from about 3 to about 9 wt. % 2-pyrrolidone; up to about 5 wt. % glycol ether; up to about 4 wt. % of at least one component independently selected from the group consisting of surfactants, biocides, and metal chelators; and the balance water.

All concentrations herein are in weight percent of total ink composition, unless otherwise indicated. The purity of all components is that employed in normal commercial practice for ink-jet inks.

COLORANT

In selecting the colorants for the dye set the following factors had to be considered: solubility at low pH; lightfastness at low pH; hue and chroma on plain paper; and hue, chroma and lightfastness on special media such as ink-jet transparency film, clay coated ink-jet paper, and ink-jet glossy paper.

DYE SELECTION PROCESS

In order to take advantage of the pH-sensitive bleed control mechanism, it was necessary that the dyes were soluble at a low pH range (i.e., dyes which dissolved readily and stayed dissolved at low pH over time at ambient temperatures and in accelerated (by higher temperatures) storage conditions. Suitable pH range for the pH-sensitive bleed control mechanism is from about 2 to about 6, preferably from about 3 to about 5, and most preferably from about 3.5 to 4.5. Carboxylic acid dyes, especially those with multiple carboxy acid moieties (such as Direct Yellow 86), were not soluble at a low pH, such as a pH of 3.5 to about 4.5. Many dyes that are zwitterionic at neutral or basic pH (for example, chromophores with sulfonic acid and amino groups) were also found to be insoluble at low pH.

The next criterion was lightfastness of the dyes at low pH. It was also found that low pH had a negative effect on the lightfastness of many common dyes, as can be seen from the data in Table 2.

The next important criterion for selection of the dyes was color quality. It was important that the colorants produce highly chromatic printed images having the appropriate hue, especially on plain paper. It was found that many of the dyes that satisfied the first two requirements, namely, solubility and lightfastness at low pH, produced printed images that either or both (1) deviated from the ideal hue angle targets on plain paper, and (2) had low chroma (see Table 3).

The final consideration in selection of the dye set was chroma and lightfastness of the colorants on special media. Many magenta and yellow dyes, while reasonably lightfast on plain paper, were not lightfast on coated media and transparency films (see Table 5). In particular, some yellow colorants that were lightfast on special media and reasonably chromatic on plain paper, did not exhibit high chroma on special media (e.g., Direct Yellow 132).

The preferred ink set would have the following characteristics on plain paper:

Yellow—a one-year simulated lightfade less than about 25; a chroma greater than about 79; and a hue angle in the range from about 90 to about 100, and more preferably, a hue angle in the range from about 93 to about 97.

Magenta—a one-year simulated lightfade less than about 30; a chroma greater than about 60; and a hue angle in the range from about 343 to about 352, and more preferably, a hue angle in the range from about 345 to about 350; and Cyan—a one-year simulated lightfade less than about 15; a chroma greater than about 42; and a hue angle in the range from about 230 to about 238, and more preferably, a hue angle in the range from about 232 to about 236.

The dye set of the present invention, provided excellent color quality (i.e, appropriate hue angle and high chroma), and lightfastness on a range of media, uncoated and coated. The dye set of the present invention comprises:

Yellow—Direct Yellow 132 (DY132—available from companies such as Clariant Corp., Charlotte, N.C.), and Acid Yellow 23 (available from companies such as Hilton Davis Co., Cincinnati, Ohio);

Magenta—Magenta 377 (M377—an azo dye having a triazine ring (available from Ilford AG, Rue de l'Industrie, CH-1700 Fribourg, Switzerland), and Acid Red 52 (AR52—available from companies such as Tricon Colors, Inc., Elmwood Park, N.J.); and Cyan—Direct Blue 199 (DB199—available from companies such as Zeneca Specialist Colours, New Castle, Del.), and Acid Blue 9 (AB9—available from companies such as Warner-Jenkinson Co., Inc., St. Louis, Mo.).

The inks of the present invention comprise from about 0.1 to about 7 wt. % dye and, more preferably, from about 0.1 to about 4 wt. %. The dyes may be in their salt form, such as an alkali metal (Na, K, or Li) or quaternary ammonium. Some of these salt forms, such as Na, are commercially available. Other salt forms can be made using well known techniques.

The most preferred ink compositions comprise:

Yellow—from about 1 to about 2.1 wt. %, DY132 and from about 1 to about 2.5 wt. % AY23;

Magenta—from about 1.9 to about 3.4 wt. % M377, and from about 0.8 to about 1.4 wt. % AR52; and Cyan—from about 1.1 to about 2.2 wt. % DB 199, and from about 0.6 to about 1.3 wt. % AB9.

The preferred salt forms of the dyes are: DY132 associated with Na, and AY23 associated with tetramethylammonium (TMA); M377 associated with Na, and AR52 associated with Li; and DB199 associated with TMA, and AB9 associated with Na.

The dyes may be purified according to standard processes such as that described in U.S. Pat. No. 4,685,968 (entitled "Process for Preparing Ink Compositions for Ink-Jets Printers" by Palmer, issued Aug. 11, 1987 and assigned to the same assignee as the present invention) employing a reverse osmosis process. With some dyes (specifically, Acid Yellow 23), a conventional ion exchange process is required after purification.

ACID

When the use of a pH-sensitive bleed control mechanism is desired, an acid may be used in the inks at a concentration sufficient to allow for the pH-sensitive bleed control mechanism to be effective. Preferably, the acid is an organic acid having a concentration in the ink ranging from about 0.1 to 20 wt. %. Preferably, the organic acid concentration is in the range of about 0.5 to about 8 wt. %, and most preferably, from about 1 to about 8 wt. %.

The organic acids suitably employed in the present ink-jet ink compositions include any of, or a mixture of two or more organic acids, of such compounds as, but not limited to, mono-, di-, and polyfunctional organic acids. In general, it is contemplated that any soluble organic acid having a $pK_a$ equal to or less than that of the pH-sensitive colorant of concern may be suitably employed. Preferably, one of the following classes of organic acids is employed: polyacrylic, acetic, glycolic, malonic, malic, maleic, ascorbic, succinic, glutaric, fumaric, citric, tartaric, lactic, sulfonic, and orthophosphoric acid and derivatives thereof The organic acid component may also comprise mixtures of appropriate organic acids. The particular acid employed depends on the praticular ink formulations. Glycolic, succinic, and citric acid are generally preferred, although any of the other organic acids may also be suitably employed in the practice of the invention.

pH-ADJUSTING COMPONENT

The pH of the ink can be adjusted to the desired pH using a pH-adjusting component. The pH-adjusting component may be an inorganic or organic base, or an organic acid containing a basic functional group (see U.S. application Ser. No. 08/741073 by Looman, filed on Oct. 30.1996 and assigned to the assignee of the present invention). The pH-adjusting component is preferably selected from the group consisting of alkali hydroxides, quaternary ammonium hydroxides, amino acids, and ainines. Most preferably, the pH-adjusting component is selected from the group consisting of sodium hydroxide (NaOH), tetramethylammonium hydroxide (TMAOH), β-alanine, 4-aminobutyric acid, and ethanolamine.

The pH-adjusting component is present in a range from about 0.1 to about 20 wt. %. The pH of the inks of the present invention is in a range from about 2 to about 6, preferably from about 3 to about 5, and most preferably from about 3.5 to 4.5.

VEHICLE

The vehicle of the inks of the present invention comprise such components found in commercial practice as are compatible with their respective colorants. The vehicle, preferably comprises (expressed as a percentage of total ink composition), in addition to the organic acid component and the pH-adjusting component, from about 3 to about 20 wt. % alcohol, from about 3 to about 9 wt. % 2-pyrrolidone, and up to about 5 wt. % glycol ethers.

Examples of alcohols that may be employed in the ink vehicle include any of, or a mixture of two or more of, such compounds as ethanediols (e.g., 1,2-ethanediol); propanediols (e.g., 1,2-propanediol, 1,3-propanediol, 2-ethyl-2-(hydroxymethyl)-1,3-propanediol, ethylhydroxypropanediol (EHPD)); butanediols (e.g., 1,3-butanediol, 1,4-butanediol); pentanediols (e.g., 1,5-pentanediol); hexanediols (e.g., 1,6-hexanediol, 2,5-hexanediol); octanediols (e.g., 1,2-octanediol, 1,8-octanediol); decanediols (e.g., 1,2-decanediol); butanetriols (e.g., 1,2,4-butanetriol); pentanetriols (e.g., 3-methyl-1,3,5-pentanetriol); and mixtures thereof.

The glycol ether component of the ink vehicle may comprise any of the glycol ethers and thioglycol ethers, and mixtures thereof, commonly employed in ink-jet ink compositions. Examples of such compounds include polyalkylene glycols such as polyethylene glycols (e.g., diethylene glycol, triethylene glycol, tetraethylene glycol), polypropylene glycols (e.g., dipropylene glycol, tripropylene glycol, tetrapropylene glycol); polymeric glycols (e.g., PEG 200, PEG 300, PEG 400, PPG 400); and thioglycol.

Most preferably, the vehicle comprises, in addition to the organic acid component and the pH-adjusting component, from about 4 to about 11 wt. % 1,5-pentanediol, from about 2 to about 8 wt. % 2-ethyl-2-hydroxymethyl-1,3-propanediol (EHPD), and from about 3 to about 9 wt. % 2-pyrrolidone.

OTHER COMPONENTS

Other components that may be employed in the present ink vehicle include surfactants, biocides, and the like, each of which are commonly employed additives in ink-jet printing.

With particular regard to the surfactant component, the inks may optionally comprise a surfactant up to about 4 wt. %, and more preferably, from about 1 to about 2.5 wt. %. One well-known purpose of a surfactant is to prevent color-to-color bleed by increasing the penetration of the inks into the print medium. Surfactants may also be employed to create a substantially uniform surface energy in the ink, thereby reducing the occurrence of mis-directed drops due to puddling of ink on the nozzle plate. Examples of classes of surfactants that are preferably employed in the present ink compositions include anionic surfactants and nonionic surfactants.

Consistent with the requirements for this invention, various other types of additives may be employed in the ink to optimize the properties of the ink composition for specific applications. For example, as is well known to those skilled in the art, one or more biocides, fungicides, and/or slimicides (microbial agents) may optionally be used in the ink composition as is commonly practiced in the art, although given the high solvent content of the inks, the need for biocides is minimized. Examples of suitably employed microbial agents include, but are not limited to, NUOSEPT (Nudex, Inc.), UCARCIDE (Union Carbide), VANCIDE (RT Vanderbilit Co.), and PROXEL (ICI America). Additionally, sequestering agents such as EDTA may be included to eliminate deleterious effects of heavy metal impurities.

The advantages realized in the practice of the invention are illustrated in the examples below.

INDUSTRIAL APPLICABILITY

The present dye set and ink compositions disclosed herein are expected to find commercial use in ink-jet color printing.

EXAMPLES

Inks were prepared, in which the vehicle comprised the following composition in wt. %, as listed in Table 1. The pH of the inks were adjusted with TMAOH or NaOH to the desired level.

TABLE 1

| INGREDIENT | ACID FREE VEHICLE | LOW pH VEHICLE |
|---|---|---|
| 1,5-pentanediol | 8% | 8% |
| EHPD | 7.5% | 7.5% |
| Citric Acid | — | 5% |
| Tergitol 15-S-7 surfactant | 1% | 1% |
| water | balance | balance |
| pH | neutral | 4 |

PRINT SAMPLE GENERATION METHOD

Print samples of formulated inks, where necessary, were generated using a Hewlett-Packard DeskJet® printer. The print media used included plain paper such as Gilbert Bond paper manufactured by Mead; coated media such as the clay coated Hewlett-Packard Premium InkJet Paper part number 51634Y; film-based glossy media such as Hewlett-Packard Premium Glossy Paper, part number C3836A; and film-based transparency such as Hewlett-Packard Premium Inkjet Transparency film, part number HPC3834A.

LIGHTFADE AND COLOR QUALITY MEASUREMENT

Color quality and lightfade were measured by printing a color palette on two sheets for each desired ink/print medium combination. The color palette comprised cyan, magenta, and yellow 100% area-filled squares of approximately 1 cm$^2$, each 300 dpi (dots per inch) pixel receiving about 60 picoliters of ink. Color palettes containing the secondary colors (i.e., red, green, and blue) were also generated for select dye sets as necessary (Table 4), with each 300 dpi (dots per inch) pixel receiving about 120 picoliters of ink. The order of ink lay down for the secondary colors was cyan, magenta, and yellow, as appropriate. The color coordinates, L*, a*, and b* of the printed images were measured using a commercial colorimeter such as the BYK-Gardner TCM, made by BYK-Gardner Inc., Silver Springs, Md., USA, using standard color measurement procedures. To further evaluate lightfade, one of the print samples for each of the ink/medium combinations was exposed to the equivalent of one year of office light (determined by following the manufacturer's instructions) using an Atlas Fadeometer. The color coordinates of the lightfade images were measured using the same procedure describe above. Hue angle (h°) and Chroma (C*) were calculated for each print sample, were appropriate, using Equations 1 and 2 above, respectively. Lightfade, represented by ΔE, for each sample set was calculated using Equation 4, above.

It is desirable that the lightfade value be minimized and chroma be maximized. The desired hue depends on the ink color, namely, yellow, magenta, and yellow. The desired h° for yellow, magenta, and cyan were about 95, about 347, and about 235 degrees, respectively.

EFFECT OF PH ON LIGHTFASTNESS

Inks were formulated using the dyes listed in Table 2 below, and the two vehicles listed in Table 1, above. Print samples were generated on plain paper. Lightfade was measured and is reported in Table 2. Absorbance was measured at lambda max for each ink at a 1:10,000 dilution.

TABLE 2

| DYE | ABSORBANCE | ΔE IN LOW PH ACID VEHICLE | ΔE IN ACID-FREE VEHICLE |
|---|---|---|---|
| YELLOW DYES | | | |
| Direct Yellow 4 | 0.16 | 20 | 15 |
| TMA Acid Yellow 23 | 0.16 | 41 | 22 |
| Na Direct Yellow 132/TMA Acid Yellow 23 | 0.09/0.09 | 18 | 10 |
| MAGENTA DYES | | | |
| Procion Red H8B | 0.12 | 27 | 19 |
| Procion Red3-BNA (aka Reactive Red 29) | 0.12 | 21 | 13 |
| Na Reactive Red 180, hydrolyzed | 0.12 | 33 | 23 |
| Acid Red 289 | 0.15 | 54 | 45 |
| Na Reactive Red 180, hydrolyzed/Li Acid Red 52 | 0.12/0.18 | 42 | 34 |
| NaM377/Li Acid Red 52 | 0.092/0.138 | 19 | 14 |
| CYAN DYES | | | |
| Na Acid Blue 9 | 0.21 | 53 | 41 |
| TMA Direct Blue 199/Na Acid Blue 9 | 0.09/0.158 | 15 | 15 |

As evidenced by the data in Table 2, pH played a significant role in the lighfastness of the inks formulated with different dyes. As can be noted, inks formulated using the present dye set exhibited excellent lightfastness, even at low pH.

COLOR QUALITY AND LIGHTFADE ON UNCOATED PAPER

Inks were formulated using dyes according to Table 3 below, and the low pH vehicle described in Table 1. Print samples were generated on plain paper. Color quality and lightfade were measured and are reported in Table 3. Absorbance was measured at lambda max for each ink at a 1:10,000 dilution.

TABLE 3

| DYES | ABSORBANCE | ΔE IN LOW PH ACID VEHICLE | h° | C* | COMMENT |
|---|---|---|---|---|---|
| YELLOW DYES | | | | | |
| TMA Acid Yellow 23 | 0.16 | 41 | 95 | 81 | good hue, large lightfade |
| Direct Yellow 4 | 0.16 | 20 | 88 | 88 | too red in hue |
| Projet Yellow 3RNA | 0.16 | 12 | 75 | 74 | much too red in hue, low chroma |
| Reactive Yellow 37 | 0.16 | 20 | 99 | 68 | too green in hue, low chroma, |
| Direct Yellow 132 | 0.16 | 23 | 95 | 74 | good hue, low chroma, |
| Acid Yellow 17 | 0.16 | 10 | 102 | 74 | too green in hue, low chroma |
| Acid Yellow 79 | 0.16 | 24 | 98 | 76 | Low chroma |
| Direct Yellow 50 | 0.16 | 14 | 87 | 68 | too red in hue, low chroma |
| Y104[1] | 0.16 | 8 | 86 | 71 | |
| Na Direct Yellow 132/TMA Acid Yellow 23 | 0.09/0.09 | 18 | 93 | 88 | present dye set, h° close to target[2] |
| MAGENTA DYES | | | | | |
| Na Reactive Red 180, hydrolyzed/Li Acid Red 52 | 0.12/0.18 | 42 | 349 | 62 | good hue, large lightfade |
| Procion Red H8B | 0.12 | 27 | 353 | 63 | too red in hue |
| Procion Red 3-BNA | 0.12 | 21 | 5 | 66 | too red in hue |
| Projet Red PX6B | 0.12 | 29 | 352 | 62 | too red in hue |
| Na Reactive Red 180, hydrolyzed | 0.12 | 33 | 356 | 62 | too red in hue |
| Magenta 377 | 0.12 | 8 | 357 | 54 | too red in hue |
| Na Ilford M377/Li Acid Red 52 | 0.092/0.138 | 19 | 349 | 62 | present dye set, h° close to target[2] |
| CYAN DYES | | | | | |
| TMA Direct Blue 199/Na Acid Blue 9 | 0.90/0.158 | 15 | 232 | 44 | present dye set, h° close to target[2] |
| Basic Blue 33 Cl | 0.15 | 10.7 | 242 | 40 | too blue in hue, low chroma |
| Projet Turquoise HA | 0.15 | 5.8 | 221 | 39 | too green in hue, low chroma |
| Projet Turquoise H7G | 0.15 | 8.8 | 218 | 40 | too green in hue, low chroma |
| Acid Blue 185 | 0.15 | 6.8 | 214 | 39 | too green in hue, low chroma |
| TMA Direct Blue 199 | 0.15 | 4.3 | 219 | 40 | too green in hue |

[1]Yellow 104 available from (available from Ilford AG, Rue de l'Industrie, CH-1700 Fribourg, Switzerland).
[2]The desired h° for yellow, magenta, and cyan were about 95, about 347, and about 235 degrees, respectively.

As can be seen from the data in Table 3, only the present dye set provided both excellent color quality and lightfade on uncoated media.

To better demonstrate the effect of the primary colorants (yellow, magenta, and cyan) on the color quality of secondary colors (red, green, blue), the color quality for the present dye set and other dye sets on plain paper were measured and are reported in Table 4. Lightfade for the secondary colors generated with the present dye set was also measured and is reported in Table 4. It should be noted that the examples in Table 4 are permutations of magenta and cyan dyes only. Yellow, as a primary color has to exhibit printed images of appropriate hue and chroma on plain paper independent of its performance in creating secondary colors.

TABLE 4

| DYE SET | | YELLOW | MAGENTA | CYAN | RED | GREEN | BLUE | COMMENT |
|---|---|---|---|---|---|---|---|---|
| DY132/AY23 M377/AR52 DB199/AB9 | C* | 88 | 62 | 44 | 55 | 55 | 36 | present dye set |
| | h° | 93 | 349 | 232 | 25 | 155 | 291 | |
| | ΔE | 18 | 19 | 15 | 12 | 17 | 17 | |
| EFFECT OF MAGENTA | | | | | | | | |

TABLE 4-continued

| DYE SET | | YELLOW | MAGENTA | CYAN | RED | GREEN | BLUE | COMMENT |
|---|---|---|---|---|---|---|---|---|
| COLORANT | | | | | | | | |
| DY132/AY23 RR180 DB199/AB9 | C* | 88 | 62 | 44 | 67 | — | 35 | |
| | h° | 93 | 356 | 232 | 33 | — | 294 | the red is too orange |
| EFFECT OF MAGENTA COLORANT | | | | | | | | |
| DY132/AY23 M377 DB199/AB9 | C* | 88 | 54 | 44 | 55 | — | 26 | low chroma blue |
| | h° | 93 | 357 | 232 | 34 | — | 285 | the red is too orange |
| EFFECT OF CYAN COLORANT | | | | | | | | |
| DY132/AY23 M377/AR52 DB199 | C* | 88 | 62 | 40 | — | 55 | 36 | |
| | h° | 93 | 349 | 219 | — | 148 | 298 | the blue is too red (i.e., purple) |
| EFFECT OF CYAN COLORANT | | | | | | | | |
| DY132/AY23 M377/AR52 BB33 | C* | 88 | 62 | 40 | — | 45 | 36 | Low chroma green |
| | h° | 93 | 349 | 242 | — | 142 | 303 | the blue is too red (i.e., purple) |

The desired hue angle and chroma for the secondary colors of red, green, and blue, respectively, are from about 24 to about 28, from about 145 to about 155, from about 285 to about 295; and greater than 52, greater than 51, and greater than 35. As can be seen from the data in Table 4, only the present dye set produced secondary colors having the desired hue and high chroma.

COLOR QUALITY ON COATED MEDIA AND TRANSPARENCY

Inks were formulated using the dyes listed in Table 5 below, and the low pH vehicle listed in Table 1. Print samples were generated on film-based glossy paper, transparency film, and clay coated paper. Lightfade and C* were measured and are reported in Table 5. Absorbance was measured at lambda max for each ink at a 1:10,000 dilution.

TABLE 5

| | | MEDIA | | | | | |
|---|---|---|---|---|---|---|---|
| | | GLOSSY MEDIA | | TRANSPARENCY FILM | | CLAY COATED PAPER | |
| | ABSORBANCE | ΔE | C* | ΔE | C* | ΔE | C* |
| DYES | | | | | | | |
| YELLOW DYES | | | | | | | |
| Direct Yellow 4 | 0.16 | 13 | 90 | 6 | 87 | 50 | 94 |
| Reactive Yellow 37 | 0.16 | 76 | 85 | 51 | 76 | 50 | 79 |
| Direct Yellow 132 | 0.16 | 3 | 76 | 4 | 70 | 14 | 83 |
| Acid Yellow 17 | 0.16 | 33 | 79 | 22 | 72 | 42 | 82 |
| Acid Yellow 19 | 0.16 | 61 | 92 | 37 | 87 | 47 | 94 |
| Acid Yellow 79 | 0.16 | 13 | 81 | 13 | 75 | 20 | 83 |
| Direct Yellow 50 | 0.16 | 6 | 77 | 10 | 77 | 18 | 87 |
| TMA Acid Yellow 23 | 0.16 | 78 | 95 | 76 | 95 | 16 | 93 |
| Y104 | 0.16 | 3 | 73 | 5 | 76 | 8 | 83 |
| Na Direct Yellow 132/ TMA Acid Yellow 23 | 0.09/0.09 | 26 | 94 | 31 | 97 | 20 | 97 |

TABLE 5-continued

| DYES | ABSORBANCE | GLOSSY MEDIA ΔE | C* | TRANSPARENCY FILM ΔE | C* | CLAY COATED PAPER ΔE | C* |
|---|---|---|---|---|---|---|---|
| MAGENTA DYES | | | | | | | |
| Procion Red H8B | 0.12 | 70 | 88 | 78 | 80 | 41 | 74 |
| Procion Red 3-BNA | 0.12 | 60 | 75 | 69 | 78 | 31 | 73 |
| Projet Red PX6B | 0.12 | 81 | 78 | 81 | 83 | 43 | 76 |
| Na Reactive Red 180, hydrolyzed/ Li Acid Red 52 | 0.12/0.18 | 48 | 74 | 64 | 82 | 28 | 72 |
| Na Ilford M377/Li Acid Red 52 | 0.092/0.138 | 12 | 71 | 15 | 78 | 31 | 70 |

As evidenced by the data in Tables 2 through 5, each of the inks formulated in accordance with the present invention produced print samples exhibiting significantly lower light-fade at lower pH while having high chroma. It should be noted that that the inks of the present invention demonstrated improved lightfastness (lower lightfade) across the media set.

Thus, there has been disclosed herein an ink-jet dye set comprising Magenta 377 and Red 52, Direct Yellow 132 and Acid Yellow 23, and Direct Blue 199 and Acid Blue 9, for the purpose of providing excellent color quality and lightfastness across a range of media, plain and coated, in particular at low pH. It will be readily apparent to those skilled in the art that various changes and modifications of an obvious nature may be made without departing from the spirit of the invention. All such changes and modifications are considered to fall within the scope of the invention as defined by the appended claims.

What is claimed is:

1. An ink set for ink-jet printing, comprising:
a yellow ink comprising at least one yellow dye, said yellow ink having, on plain paper, a hue angle in the range from about 90 to about 100, a chroma greater than about 79, and a one-year simulated lightfade less than about 25;
a magenta ink comprising at least one magenta dye, said magenta ink having, on plain paper, a hue angle in the range from about 343 to about 352, a chroma greater than about 60, and a one-year simulated lightfade less than about 30; and
a cyan ink comprising at least one cyan dye, said cyan ink having, on plain paper, a hue angle in the range from about 230 to about 238, a chroma greater than about 42, and a one-year simulated lightfade less than about 15;
said yellow, magenta, and cyan dyes being soluble in an aqueous vehicle having a pH in the range from about 2 to about 6.

2. The ink set of claim 1 wherein
the yellow ink has a hue angle in the range from about 93 to about 97;
the magenta ink has a hue angle in the range from about 345 to about 350; and
the cyan ink has a hue angle in the range from about 232 to about 236.

3. An ink set for ink-jet printing, comprising:
a yellow ink comprising Direct Yellow 132 and Acid Yellow 23 dyes;
a magenta ink comprising Magenta 377 and Acid Red 52 dyes; and
a cyan ink comprising Direct Blue 199 and Acid Blue 9 dyes.

4. The ink set of claim 3 wherein the total dye concentration in each ink ranges from about 0.1 to about 7 wt. %.

5. The ink set of claim 3 wherein the total dye concentration in each ink ranges from about 0.1 to about 4 wt. %.

6. The ink set of claim 3 wherein
the yellow ink comprises from about 1 to about 2.1 wt. % Direct Yellow 132 and from about 1 to about 2.5 wt. % Acid Yellow 23;
the magenta ink comprises from about 1.9 to about 3.4 wt. % Magenta 377 and from about 0.8 to about 1.4 wt. % Acid Red 52; and
the cyan ink comprises from about 1.1 to about 2.2 wt. % Direct Blue 199 and from about 0.6 to about 1.3 wt. % Acid Blue 9.

7. The ink set of claim 3 wherein
the Direct Yellow 132 is associated with sodium and Acid Yellow 23 is associated with tetramethylammonium;
Magenta 377 is associated with sodium and Acid Red 52 is associated with lithium; and
Direct Blue 199 is associated with tetramethylammonium and Acid Blue 9 is associated with sodium.

8. The ink set of claim 3 wherein the pH for each ink is in range from about 2 to about 6.

9. The ink set of claim 8 wherein the pH for each ink is in range from about 3 to about 5.

10. The ink set of claim 9 wherein the pH for each ink is in range from about 3.5 to about 4.5.

11. The ink set of claim 3 wherein each ink further comprises an organic acid.

12. The ink set of claim 11 wherein the organic acid is selected from the group consisting of glycolic, succinic, citric acid, and mixtures thereof.

13. The ink set of claim 11 wherein the organic acid is present in a concentration ranging from about 0.1 to about 20 wt. %.

14. The ink set of claim 13 wherein the organic acid is present in a concentration ranging from about 0.5 to about 8 wt. %.

15. A method for printing using an ink-jet printer, comprising printing from a set of ink-jet inks onto a printing medium, said ink set comprising:

a yellow ink comprising Direct Yellow 132 and Acid Yellow 23 dyes;

a magenta ink comprising Magenta 377 and Acid Red 52 dyes; and a cyan ink comprising Direct Blue 199 and Acid Blue 9 dyes.

16. The method of claim 15 wherein the total dye concentration in each ink ranges from about 0.1 to about 7 wt. %.

17. The method of claim 15 wherein the pH for each ink is in range from about 2 to about 6.

18. The method of claim 17 wherein each ink further comprises an organic acid.

19. A method for printing using an ink-jet printer, comprising printing from a set of ink-jet inks onto a printing medium, wherein on plain paper:

the yellow ink has a hue angle in the range from about 90 to about 100, a chroma greater than about 79, and a one-year simulated lightfade less than about 25;

the magenta ink has a hue angle in the range from about 343 to about 352, a chroma greater than about 60, and a one-year simulated lightfade less than about 30; and the cyan ink has a hue angle in the range from about 230 to about 238, a chroma greater than about 42, and a one-year simulated lightfade less than about 15.

* * * * *

UNITED STATES PATENT AND TRADEMARK OFFICE
CERTIFICATE OF CORRECTION

PATENT NO. : 5,772,742

DATED : 6/30/98

INVENTOR(S) : Wang

It is certified that error appears in the above-identified patent and that said Letters Patent is hereby corrected as shown below:

Column 5, line 31, delete "praticular" and add --particular--.

Signed and Sealed this

Ninth Day of February, 1999

Attest:

Attesting Officer

*Acting Commissioner of Patents and Trademarks*